United States Patent
Kusber et al.

(10) Patent No.: US 7,040,586 B2
(45) Date of Patent: May 9, 2006

(54) BRACKET ASSEMBLY

(75) Inventors: Angelo Joseph Kusber, Savage, MN (US); Jeffrey Paul Hanel, Savage, MN (US)

(73) Assignee: Universal Formations, Inc., Lakeville, MN (US)

( * ) Notice: Subject to any disclaimer, the term of this patent is extended or adjusted under 35 U.S.C. 154(b) by 0 days.

(21) Appl. No.: 10/728,593

(22) Filed: Dec. 3, 2003

(65) Prior Publication Data

US 2005/0121558 A1    Jun. 9, 2005

(51) Int. Cl.
*E04G 25/00* (2006.01)

(52) U.S. Cl. .................... 248/200.1; 248/906; 248/916

(58) Field of Classification Search ................ 248/58, 248/200.1, 906, 205.1, 298.1, 916, 343; 411/499, 411/353, 107, 2, 3, 5, 41
See application file for complete search history.

(56) References Cited

U.S. PATENT DOCUMENTS

| | | | | |
|---|---|---|---|---|
| 2,809,002 A | * | 10/1957 | Rudolph | ...................... 248/57 |
| 2,917,263 A | | 12/1959 | Appleton et al. | |
| 3,104,087 A | | 9/1963 | Budnick et al. | |
| 3,163,386 A | | 12/1964 | Collins | |
| 3,285,553 A | | 11/1966 | Hexdall | |
| 3,718,307 A | | 2/1973 | Albanese | |
| 4,395,260 A | | 7/1983 | Todd et al. | |
| 4,538,786 A | | 9/1985 | Manning | |
| 4,568,330 A | | 2/1986 | Kujawski et al. | |
| 4,666,055 A | * | 5/1987 | Lewis | ........................ 220/3.2 |
| 4,717,099 A | | 1/1988 | Hubbard | |
| 4,734,269 A | | 3/1988 | Clarke et al. | |
| 4,784,396 A | * | 11/1988 | Scott et al. | .................. 277/598 |
| 4,909,405 A | | 3/1990 | Kerr, Jr. | |
| 5,209,444 A | | 5/1993 | Rinderer | |
| 5,243,802 A | * | 9/1993 | Zetena, Jr. | .................... 52/514 |
| 5,312,352 A | | 5/1994 | Leschinsky et al. | |
| 5,386,959 A | | 2/1995 | Laughlin et al. | |
| 5,407,310 A | * | 4/1995 | Kassouni | ..................... 411/107 |
| 5,439,448 A | | 8/1995 | Leschinsky et al. | |
| 5,591,374 A | | 1/1997 | Kniep et al. | |
| 5,678,799 A | | 10/1997 | Jorgensen et al. | |

(Continued)

OTHER PUBLICATIONS

Article Information "New products stir the pot, keep industry humming," printed on Jan. 29, 2003.

(Continued)

*Primary Examiner*—Ramon O Ramirez
(74) *Attorney, Agent, or Firm*—Crompton, Seager & Tufte, LLC (57) ABSTRACT

A hanger assembly adapted and/or configured for use in hanging, supporting, and/or securing building components, such as ducts, pipes, and the like, between structural members, such as joists, studs, rafters, or the like, and methods of making and/or using the hanger assembly. In some embodiments, the hanger assembly includes one or more threaded fastening members that are each pre-disposed and/or captured within the structure of the hanger assembly prior to use. One or more captivating mechanisms and/or structures can be provided to selectively couple one or more of the fastening members within an opening in the assembly such that the fastening member is held in place within the opening prior to use.

16 Claims, 5 Drawing Sheets

U.S. PATENT DOCUMENTS

| | | |
|---|---|---|
| 5,938,157 A | 8/1999 | Reiker |
| 6,062,515 A | 5/2000 | Snyder |
| 6,086,029 A | 7/2000 | Oliver |
| 6,105,918 A | 8/2000 | Gromotka |
| 6,123,154 A | 9/2000 | MacDonald, III et al. |
| 6,296,211 B1 | 10/2001 | Snyder |
| 6,481,676 B1 | 11/2002 | Bluestone |
| 6,654,253 B1 * | 11/2003 | DiMarco ................. 361/730 |
| 6,768,071 B1 * | 7/2004 | Gretz ..................... 200/297 |
| 2003/0006353 A1 * | 1/2003 | Dinh et al. ............. 248/343 |

OTHER PUBLICATIONS

Basset Product Literature.

* cited by examiner

BRACKET ASSEMBLY

FIELD OF THE INVENTION

The invention generally pertains to a bracket assembly, such as a hanger assembly for use in hanging, supporting, and/or securing building components, such as ducts, pipes, and the like, between structural members in a building, such as joists, studs, rafters, or the like.

BACKGROUND

It is sometimes necessary during construction, remodeling, and/or retrofitting of structures, such as residential and/or commercial buildings, to hang, support, and/or otherwise secure certain building components between structural members of the building. For example, ducts for use in heating, cooling, and/or ventilation systems (i.e. HVAC systems) are often hung, supported, and/or otherwise secured between structural members of the building, such as joists, studs, rafters, or the like.

There are known devices and methods of making and using duct hanger assemblies—each having advantages and disadvantages. There is an ongoing need to provide alternative designs, structures, assemblies, and/or methods for hanging, supporting, and/or otherwise securing building components between structural members in a building.

SUMMARY OF SOME EMBODIMENTS

The invention provides several alternative designs, structures, assemblies, methods of making and/or methods of using devices adapted and/or configured for hanging, supporting, and/or otherwise securing building components between structural members in a building. In some example embodiments, the hanger assemblies can include one or more pre-disposed threaded fastening member.

For example, one embodiment provides a hanger assembly for securing a building component to one or more structural members of a building. The assembly includes an elongated structure including a first end and a second end, and a flange disposed on the first end configured for being coupled to a structural member of a building. The flange defines an opening therein having an outer perimeter defined by the flange. A threaded fastening member, for example a screw, is pre-disposed within the opening. The threaded fastener member is configured to couple the flange to the structural member of a building.

Another example embodiment relates to a method for securing a building component to one or more structural members of a building. The method includes providing a hanger assembly, including a threaded fastening member pre-disposed within the structure of the assembly, for example, as set forth above. The hanger assembly is then positioned such that the flange is disposed adjacent the structural member of the building, and such that a portion of the assembly engages the building component. The threaded fastening member can be manipulated to couple the flange to the structural member.

Another example embodiment relates to a method of making a hanger assembly adapted for use by an end user for securing a building component to a structural member of a building. The method includes providing a metal material, and working the metal material to create an elongated structure including a first end and a second end, a flange disposed on the first end. The flange defines an opening therein having an outer perimeter defined by the flange, and the flange is configured for being coupled to a structural member of a building. A threaded fastening member is pre-disposing within the opening, and is configured to couple the flange to the structural member of a building. The hanger assembly is then distributed to an end user.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF SOME ILLUSTRATIVE EMBODIMENTS

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The drawings, which are not necessarily to scale, depict illustrative embodiments and are not intended to limit the scope of the invention. For example, although some embodiments are shown and discussed with specific reference to assemblies which are adapted for use in duct hanging, it should be understood that the invention may be adapted or configured for other uses. For example, certain aspects of the invention may be applicable for use in hanging, supporting, and/or securing other heating and/or cooling and/or ventilation systems, or other building components, such as pipes, conduits, electrical components an/or devices, plumbing and/or sewage components an/or devices, or the like.

An additional note with respect to the following description is that, while the hanger assembly is described in terms of different sections, the device, individual components thereof, or multiple sections thereof, may be made as a single element, for example, through forming, bending, cutting, working, molding, casting, extrusion, and the like. Variations in sizes and flexibility, as well as the inclusion of rigid or semi-rigid materials, should not be interpreted as requiring a certain method or type of construction. While the present description is written largely in terms of use in construction or installation in structures such as buildings, the present invention may also be used with other applications.

Figure 1:
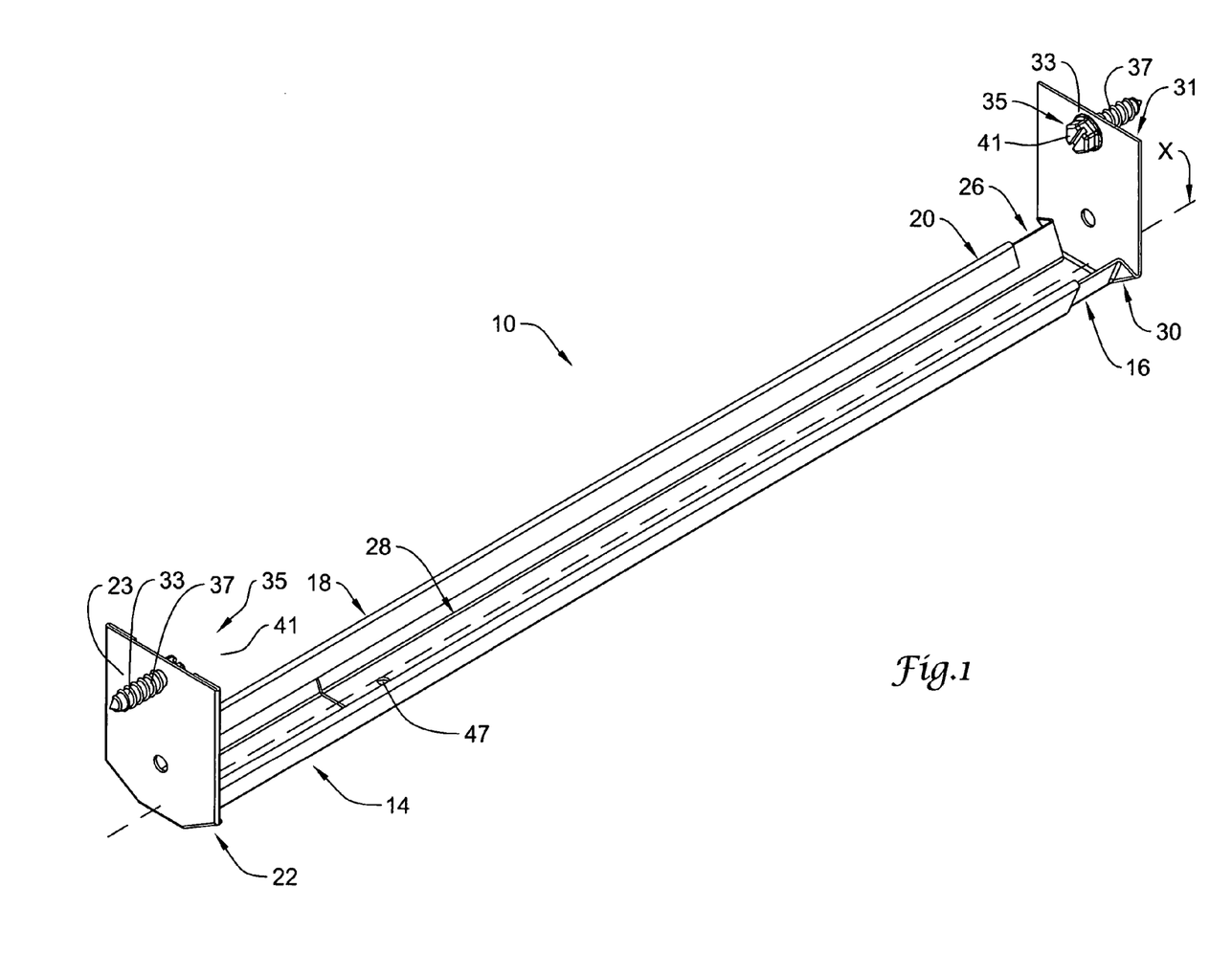
FIG. 1 is a schematic perspective view of an expandable hanger assembly in accordance with one example embodiment.
Figure 2:
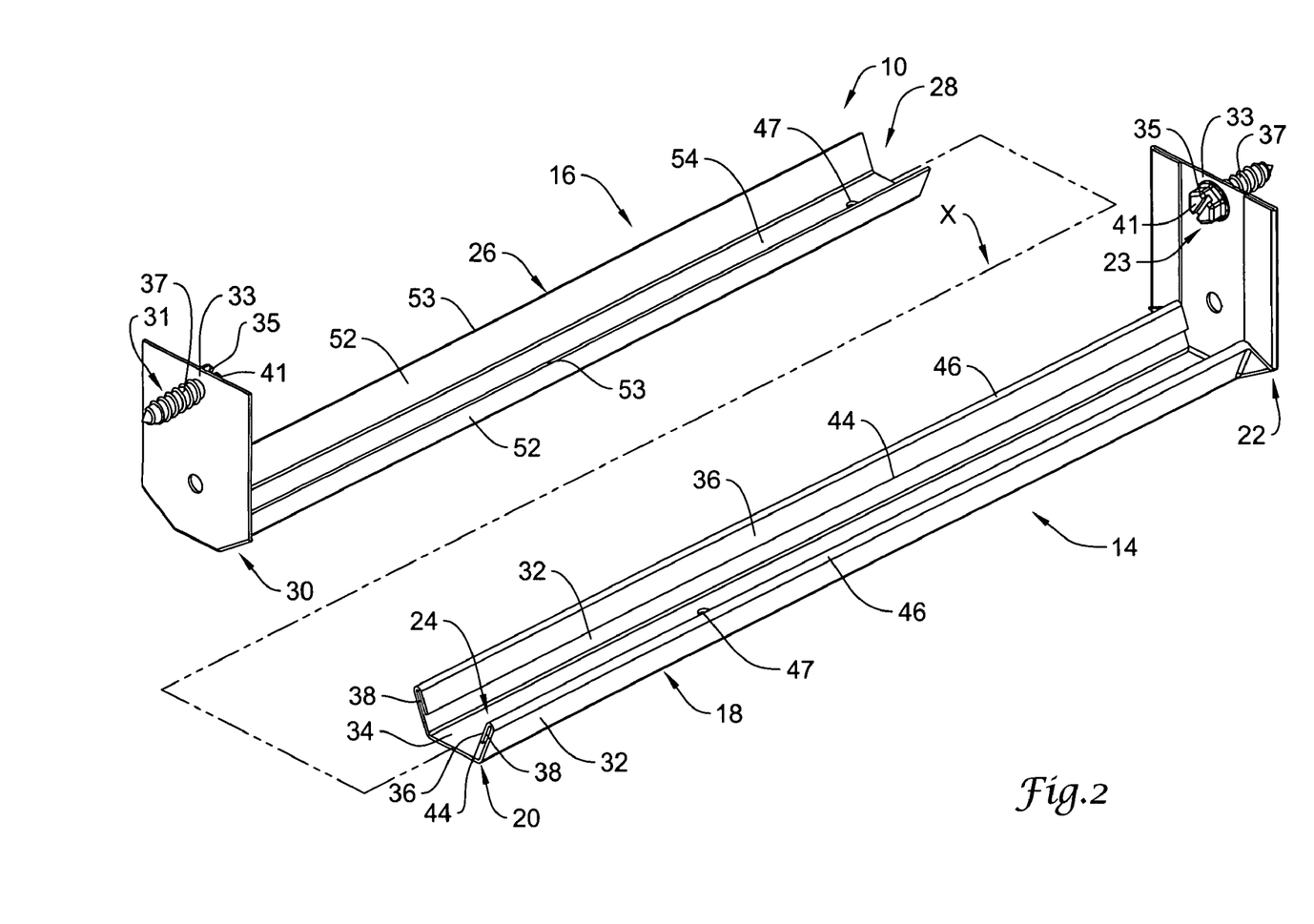
FIG. 2 is a schematic partially exploded perspective view of the expandable hanger assembly of FIG. 1.

Refer now to FIGS. 1 and 2, which show one example embodiment of a bracket assembly 10 adapted and/or configured for hanging, supporting, and/or securing building components (e.g. ducts, pipes, conduits, devices, or the like), between structural members in a building (e.g. joists, studs, rafters, or the like). In the embodiment shown, the bracket assembly 10 can be an adjustable assembly including an elongated structure including a first elongated member 14 and a second, separate elongated member 16. The first elongated member 14 and the second elongated member 16 can be adapted and/or configured for selective sliding engagement generally along a longitudinal axis, X, such that the effective length of the bracket assembly 10 can be selectively adjusted, as desired, and as will be discussed in more detail below. In this document, the term "longitudinal" should be understood to mean in a direction corresponding to an elongated direction of the bracket assembly 10. It should also be understood that in some other embodiments, the bracket assembly 10 may include a different mechanism for selective adjustment of the length, or may be non-adjustable.

Referring to FIG. 2, the first elongated member 14 includes a first elongated body portion 18 having a first end 20 and a second end 22. The second end 22 includes a flange 23 that is adapted and/or configured for attachment to a structural member in a building, such as a joist, stud, rafter, or the like. The second elongated member 16 includes an elongated body portion 26 having a first end 28 and a second end 30. The second end 30 also includes a flange 31 that is adapted and/or configured for attaching the assembly to a structural member in a building, such as a joist, stud, rafter, or the like. The flanges 23 and 31 each define and/or include one or more openings 33 defined therein that are adapted and/or configured to receive and/or mate with and engage a fastening member that may be used, for example, to attach the bracket assembly 10 to a building structure.

The flanges 23 and 31 can each be a separate member attached or connected to the body portions, respectively, and/or can be of unitary construction with the body portion. For example, in at least some embodiments, each of the flanges 23/31 and body portions 18/26, respectively, can be formed of a unitary piece of material, such as a sheet of metal or the like, and bent, shaped, cut, or otherwise formed into the desired structures. The angle of each of the flanges 23/31 relative to the body portions 18/26, and/or relative to the longitudinal axis, X, can vary, as desired, depending at least partially upon the intended use of the assembly 10. In the embodiment shown, the angles defined by each of the flanges 23/31 relative to the associated body portions 18/26 is generally about 90°, however, this angle can be varied as desired. For example, in some embodiments, the angle of each of the flanges 23/31 relative to the body portions 18/26, and/or relative to the longitudinal axis, X, can be in the range of about 45° to about 135°, or more or less, depending upon the intended use of the assembly 10. Additionally, in at least some embodiments, each or the flanges 23/31 may extend away from the longitudinal axis X in different directions and/or at different angles. For example, one of the flanges may extend away from the longitudinal axis along one side of the assembly at a first angle, and a second of the flanges may extend away from the longitudinal axis along a second side of the assembly at a second angle. Those of skill in the art and others will be able to determine the appropriate configuration of the flanges 31 given the intended use of the assembly 10.

The assembly 10 also includes one or more fastening members 35 that are each "pre-disposed" within one of the openings 33. By pre-disposed, it is meant that the one or more fastening members 35 are disposed (i.e. coupled and/or captivated) within one of the openings 33 prior to use of the assembly 10, and in at least some embodiments, prior to distribution and/or dissemination of the final assembly 10 to an end user for use. In other words, the fastener members 35 are disposed within one of the openings 33 prior to distribution and/or dissemination of the assembly 10 for use, for example, in securing building components between structural members of a building. The one or more fastening members 35 can be coupled and/or captivated (i.e. pre-disposed) within one of the openings 33 during the manufacture of the assembly 10. For example, the assembly 10 may be manufactured in a manufacturing facility, and the one or more fastening members 35 are coupled and/or captivated (i.e. pre-disposed) within one of the openings 33 prior to the departure of the assembly 10 from the manufacturing facility.

The fastening members 35 can be any or a broad variety of such fastening members that are adapted and/or configured to selectively and/or permanently attach the bracket assembly 10 to structural members in a building during use. In many embodiments, the fastener members are threaded fastener members, for example, in that they include threads that are adapted and/or configured to engage the outer periphery of the openings 33 and/or engage the structural member to which the assembly 10 is being attached, or both. Some examples of suitable threaded fastener members include screws, such as wood or metal screws, bolts, or the like. In at least some embodiments, the fastener members may include a threaded portion including threading 37, and a head portion 41 that may be adapted and/or configured for engagement by a tool (e.g. screwdriver, wrench, or the like) for manipulation.

In the embodiment shown, there are two fastener member 35 pre-disposed in two of the openings 33—one in each flange 23/31. However, in other embodiments, there may be more or fewer predisposed fastener members 35 in one or both of the flanges. For example, some embodiments may include one or more predisposed fastener members in one of the flanges, while including no predisposed fastener members in the other of the flanges. In some embodiments, the total number of fastener members in both flanges combined may be in the range of about 1 to about 10, or in the range of about 2 to about 6. However, those of skill in the art will recognize that the number of fastener member may vary, depending at least somewhat upon the intended use of the assembly.

In some embodiments, the mechanisms and/or structures used to pre-disposed and/or captivate the fastening members 35 involves the use of threads on the fastening members 35 to engage the outer periphery of the openings 33. For example, in the embodiment shown in FIGS. 1 and 2, each of the fastening members 35 is a threaded screw, such as a wood screw, or the like, and each includes threading 37. The threading 37 on an individual screw 35 can be sized an/or otherwise configured such that at least a portion of the threading 37 can threadingly engage the outer periphery of the openings 33. As such, the screws 35 can be threaded at least partially within the openings 33. In the embodiment shown, screws 35 are threaded into the openings 33 such that the head portions 41 are disposed directly adjacent to and/or in contact with the flanges 23/31. In other embodiments, however, one or more of the screws 35 may be threaded into the openings 33 such that the head portions 41 are spaced from and not in direct contact with the flanges 23/31. When at least partially threaded into the opening 33, the screw 35 is maintained and/or captivated within the opening 33 in a predisposed manner. In at least some embodiments, the arrangement can be adapted and/or configured such that the fastening member 35 may be predisposed in a manner to provide firm stability of the fastening member 35 within the opening 33, while still allowing for the fastening member 35 to be further manipulated for attachment to a building structure. For example, the threading engagement between the screw 35 and the opening 33 may be enough to maintain the screw within the opening 33, while still allowing the screw 35 to be screwed into, for example, a floor joist of the like, during use of the bracket assembly 10.

Certain advantages can be provided by the pre-disposed fastening member 35. For example, installation of such an assembly 10 by a user can be made significantly easier when using the pre-disposed fastening member 35. The user would not necessarily have to provide separate fastening members, or fumble around looking for misplaced fastening members to use in installing the bracket assembly 10. The fastener members would already be pre-disposed within the openings 33 of the assembly 10. Additionally, because at least some of the fastener members 35 are pre-disposed within the bracket assembly 10, the user does not necessarily have to go through the often awkward process of attempting to hold a fastening member in place during installation. For example, installation often involve holding/positioning the bracket assembly in an appropriate position, while also holding/positioning and using a tool to manipulate the fastening member into an attachment position, and holding/positioning a building component (e.g. duct, pipe, etc.), and in some cases, all while standing in an awkward position, such as on a ladder. The requirement of a user to hold fastening members in place during installation only adds to the difficulty. By providing a fastening member 35 pre-disposed within the openings 33 of the assembly 10, the user does not necessarily have to hold the fastening member in place during installation because it is already pre-disposed within the assembly 10. Therefore, at least one aspect of an often awkward installation process can be simplified by providing the predisposed fastening member 35. A user may position the assembly 10 where desired, and manipulate the fastening member 35 into an attachment position, for example, using a tool, without necessarily having to hold the fastening member 35 in position. Additionally, in at least some embodiments, the pre-disposed fastening member 35 may be captivated in such a manner as to provide firm stability of the fastener member 35 within an opening 33, while reducing the amount of torque transferred from the fastener member 35 to the assembly during attachment, for example, during screwing of the fastener member 35 into a building structure. Furthermore, in at least some embodiments, the predisposed fastener member 35 may be useful in aiding a user in positioning the assembly 10, even prior to attachment. For example, the tip of the predisposed fastener members 35, for example, the tip of the screws 35, can engage the structural members in a building (e.g. joists, studs, rafters, or the like) during the initial positioning of the assembly 10 and aid in maintaining the assembly in the desired position relative to the structural members prior to attachment. Other potential advantages may also be realized by those of skill in the art and others.

As discussed briefly above, the embodiment shown in FIGS. 1 and 2 is an example of an expandable bracket assembly 10. In that regard, the body portion 18 of the first elongated member 14 defines structure which is adapted and/or configured for selective sliding engagement with at least a portion of the elongated body portion 26 of the second elongated member 16. For example, the body portions 18 and 26 can include structure such that they may be selectively slid into mating engagement with one another, and may provide for selective expansion or reduction of the effective length of the bracket assembly 10. It should be understood by those of skill in the art and others that the elongated body portions 18 and 26 may include any of a broad variety of mating shapes and/or geometries that would suitably provide for the mating engagement.

In the embodiment shown in FIG. 2, the body portion 18 of the first elongated member 14 includes structure defining at least one groove, recess and/or channel 24 into which the at least a portion of the body portion 26 of the second elongated member 16 may selectively be slid. In the embodiment shown, the body portion 18 includes a generally U or C cross-sectional shape defining a channel 24. The channel 24 is defined by side walls 32 and web or base wall 34. The angle of each of the side walls 32 relative to the base wall 34 can vary, as desired, but in the embodiment shown, the angles defined by each of the side walls 32 relative to the base wall 34 is generally the same, and are greater than about 90°.

The body portion 26 of the second elongated member 16 includes structure such that at least a portion thereof may selectively be slid into the channel 24. Any suitable configuration that may be slid into the channel 24 may be used. In the embodiment shown, the elongated body portion 26 of the second elongated member 16 also includes a generally U-shaped or C-shaped cross-section, but it is at least slightly smaller than the cross section of the elongated body portion 18 of the first elongated member 14. Because the body portion 26 is slightly smaller in cross section than the body portion 18, the body portion 26 may fit within the channel 24 defined by the body portion 18 for selective sliding engagement therein. For example, the first end 28 of the second elongate body portion 26 may be slid into the channel 24 adjacent the first end 20 of the first elongate body portion 18 for mating generally telescoping engagement between the two portions 18/26. Length adjustments of the assembly 10 can be made by simply sliding the second elongate body portion 26 back and/or fourth within the channel 24 relative to the first elongate body portion 18.

The elongated body portion 26 of the second elongated member can also include side walls 52 defining upper longitudinal edges 53, and a web or base wall 54. Again, the angle of each of the side walls 52 relative to the base wall 54 can vary, as desired, and can be generally adapted and/or configured to selectively mate with, fit within, and/or be slid into the channel 24. In the embodiment shown, the angles defined by each of the side walls 52 relative to the base wall 54 is generally the same, and are greater than about 90°.

In some embodiments, the bracket assembly 10 may also include structure that can be adapted and/or configured for maintaining the first and second elongated members 14/16 together in a self supporting arrangement without the need of additional fasteners. For example the embodiment shown includes a flange and/or bend 36 defined in a portion of each of the side walls 32 of the first body portion 18. Each of the flanges 36 is defined in the side wall 32 at a location spaced from the base wall 34, and defines a longitudinal edge 44 and a fold edge 46. The flanges 36 each define a longitudinal channel and/or groove 38 between the each side wall 32 and flange 36. The flanges 36 and channels 38 extend substantially the entire length of the elongated body portion 18, but in other embodiments, one or more such flanges and/or channels may extend over only a portion of the length of the elongated body portion 18. For example, it is also contemplated that a plurality of such flanges, and therefore a plurality of such channels, may be defined along the length of an individual side wall 32.

The flanges 36 can each be a separate member attached or connected to the side walls 32, respectively, or can be of unitary construction with the side walls and simply be bends therein. For example, in at least some embodiments, the flanges 36 and the side walls 32 (and, optionally, the rest of the body portion 18) can be formed of a unitary piece of material, such as a sheet of metal or the like, and bent, shaped, cut, or otherwise formed into the desired structures. The angle of each of the flanges 36 relative to the associated side wall 32 can vary, as desired, but in the embodiment shown, the angles defined by each of the flanges 36 relative to the associated side wall 32 is generally less than about 90°.

The longitudinal channels and/or grooves 38 defined between the side walls 32 and flanges 36 can function as structure for maintaining the first and second elongated members 14/16 together in a self supporting arrangement. When the body portion 26 is slid within the channel 24, the upper longitudinal edges 53 of the body portion 26 may fit within the recesses and/or grooves 38 defined between the side walls 32 and flanges 36 of the body portion 18 of the first elongated member 14. In this regard, the two body portions 18/26 can be selectively engaged, and the engagement of the flanges 36 with the upper edges 53 can provide a mechanism for maintaining the two body members together in a self supporting arrangement without the need of additional fasteners. It should be understood that in other embodiments, other structures and/or geometries may be used to provide a self supporting expandable assembly.

In some embodiments, the assembly 10 may also include or define structure adapted and/or configured to provide a mechanism by which the assembly 10 can selectively and/or permanently be attached to one or more building components. For example, one or more pilot holes 47 may be provided in one or both of the body portions 18/26 such that a fastener member, for example, a threaded fastener member may extend there through for coupling of a building component, such as a duct or the like, to the assembly 10. This will be described further below in the discussion of FIG. 3.

Additionally, some embodiments may also include structure that can be adapted and/or configured for selectively maintaining the first and second elongated members 14/16 in position relative to one another. For example, once the assembly 10 is placed in the desired length configuration, one or more fastening mechanisms may be used to selectively couple the elongated members 14/16 such that the relative length of the assembly is generally maintained. A fastener member inserted through pilot holes 47 in both elongated members 14/16 would have this effect. In other embodiments, alternative structures, such as clamps, crimps, alternative fastener members, adhesives, solders, welds, or the like may be used.

The size, dimensions, and shape of the bracket assembly 10, and/or components or segments thereof, is greatly dependent upon the particular intended use of the assembly, and therefore can vary greatly. For example, although shown as including a generally "U" or "C" cross sectional shape, the elongated body members 14/16 or portions thereof, may include any of a broad variety of cross sectional shapes. For example, the cross sectional shapes of the elongated body members 14/16 or portions thereof, may be generally flat, may include one or more folds and/or bends, or may be circular, oval, square, rectangular, or other shapes, or combinations thereof. Additionally, although the body members 14/16 are shown as including generally constant widths and height dimensions along the length thereof, in other embodiments, these dimensions may change or/or taper along the length of each.

It should be understood that the following dimensions are given by way of example only, and are in no way intended to limit the scope of the invention. In some example embodiments, the bracket assembly 10 can have a length that may or may not be selectively adjustable, and may be in the range of about 5 to about 40 inches, or more. For example, some embodiments may have a length that may be selectively adjustable within the range of about 10 and 20 inches, while other embodiments may have a length that may be selectively adjustable within the range of about 15 to about 35 inches. The width of the assembly can also vary, depending upon the desired characteristics of the assembly. In some embodiments, the assembly 10 may have a width along the base wall 34 in the range of about 0.2 to about 5 inches or more, or in the range of about 0.25 to about 1 inches. In some embodiments, the assembly 10 may have a width extending between the longitudinal folds 46 in the range of about 0.2 to about 5 inches or more, or in the range of about 0.25 to about 1 inch. In some embodiments, the assembly 10 may have a height, measured as the distance from the plane of the base wall to the plane of the longitudinal folds 46, in the range of about 0.2 to about 5 inches or more, or in the range of about 0.25 to about 1 inch. In some embodiments, the flanges 23/31 may have a width that is about the same, or may vary from the width of the assembly 10. In some embodiments, the flanges 23/31 may have a width in the range of about 0.2 to about 5 inches or more, or in the range of about 0.25 to about 1 inch. The length of the flanges may also vary as desired, depending at least somewhat upon the desired characteristics of the assembly 10. In some embodiments, the flanges may have a length in the range of about 0.5 to about 5 inches, or in the range of about 1 to about 3 inches. In some embodiments, the openings 33 defined in the flanges 23/31 of the assembly 10 may have a diameter in the range of about 1/64 to about 1 inches or more, or in the range of about 1/32 to about 1/2 inches, and the threaded fastener members 35 may have a diameter along the threaded portion in the range of 1/64 to about 1 inches or more, or in the range of about 1/32 to about 1/2 inches. As noted above, these dimensions are given by way of example only, and greater and lesser dimensions may be possible given a particular desired usage.

A wide variety of materials may be used to make the bracket assembly 10, or sections or portions thereof. For example, the bracket assembly 10, or portions thereof, can be manufactured from any suitable material to impart the desired characteristics. Some examples of suitable materials can include, for example, metals, metal alloys, polymers, metal-polymer composites, or the like, or combinations or mixtures thereof. Some examples of suitable metals and metal alloys include aluminum, tin, steel, stainless steel, iron, or other such materials, alloys or combinations thereof, or the like.

The bracket assembly 10, or sections or portions thereof, can be created and interconnected using any or a broad variety of suitable techniques, including, for example, such techniques as forming, bending, cutting, working, molding, casting, extrusion, welding, soldering, brazing, adhesive bonding, mechanical interlocking, riveting, drilling, grinding, sanding, and the like. In some embodiments, the elongated members 14/16 can each be made of a unitary sheet, strip, or coiled stock of metal material, such as sheets metal. Additionally, in at least some embodiments, the flanges 23/31 can also be formed in the same unitary material as the body portions 18/26 of the elongated members 14/16, respectively. The material can be bent, formed, cut, or otherwise shaped into the desired construction including desired structures. For example, in some embodiments, roll forming can be used to bend and/or form a sheet, strip, or coiled stock of metal into a desired configuration, for example, including a channel, and a four-slide machine can be used to produce the flanges and any desired openings in the metal. Some advantages may be provided in such embodiments where the flanges 23/31 are of unitary construction with the body portions 18/26 of the elongated members 14/16. For example, in some embodiments, unitary construction of the flanges 23/31 and body portions 18/26 may provide for added strength and rigidity between the flanges 23/31 and body portions 18/26. Additionally, in some embodiments, manufacturing of the assembly may be made more efficient by avoiding the need to separately attach the flanges 23/31 to the body portions 18/26. Other potential advantages may also be realized by those of skill in the art and others.

Figure 3:
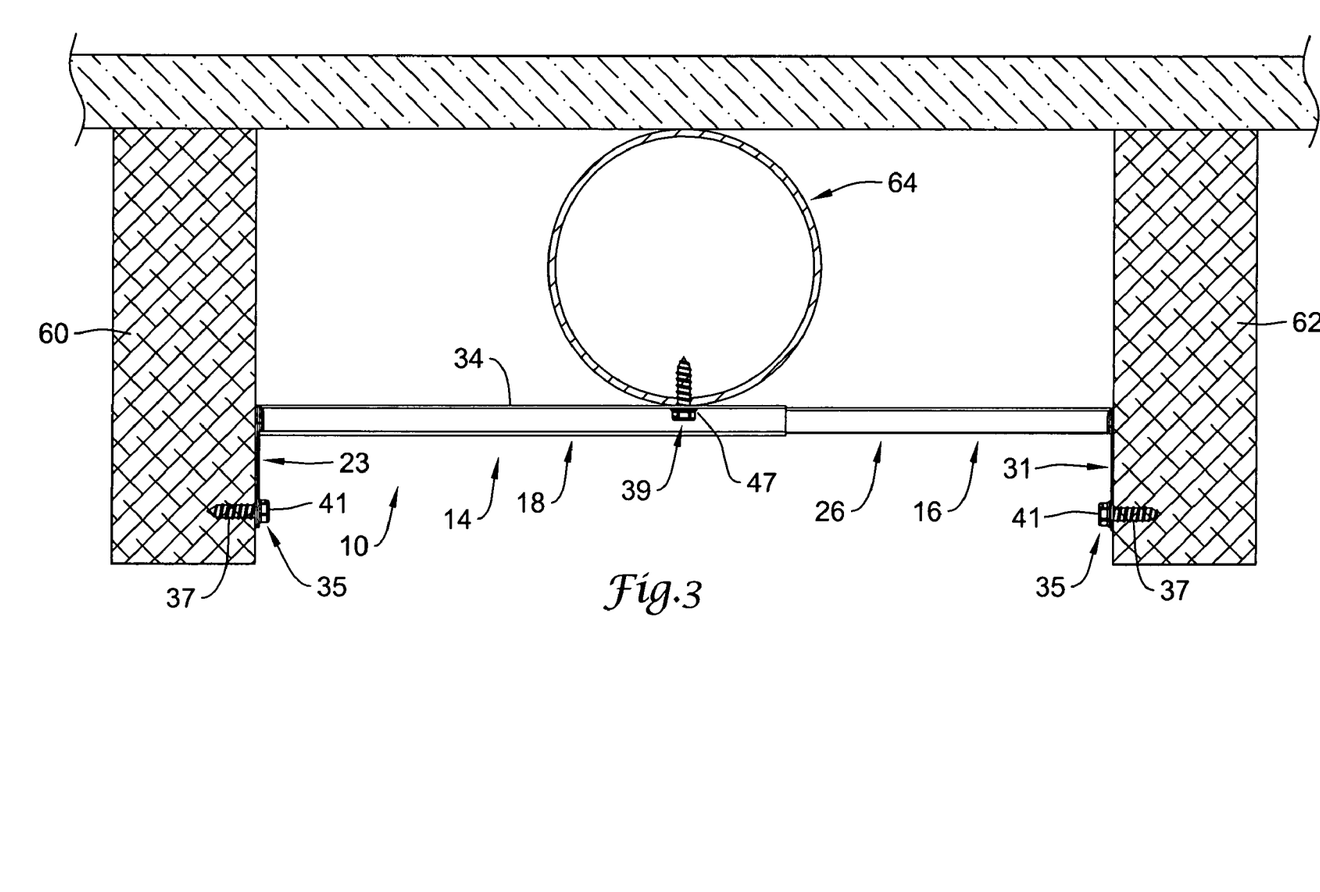
FIG. 3 is a partial cross-sectional side view of the hanger assembly of FIGS. 1 and 2 mounted between structural members of a building supporting, and/or securing a duct.

Reference will now be made to FIG. 3 for a description of the use and/or operation of the example bracket assembly 10 shown in FIGS. 1 and 2. FIG. 3 is a diagrammatic side view of the bracket assembly 10 disposed between two structural members 60 and 62, such as floor joists, and supporting a building component 64, such as an HVAC duct. In one embodiment, to install the assembly 10, the two body portions 18/26 of the elongated members 14/16 can be slid into mating engagement with one another, and adjusted to an appropriate length to fit within the distance between the structural members 60 and 62. The assembly 10 can be placed at a desired location and/or configuration between the structural members 60 and 62 adjacent to and/or in supporting engagement with the building component 64. The length of the assembly 10 can be adjusted such that the flanges 23/31 each abut a surface of one of the structural members 60/62 respectively. In some embodiments, one of the flanges 23/31 can be attached to one of the structural members 60/62 first, and thereafter, the length adjustment can be made. In other embodiments, the length adjustment can be made prior to attachment of either of the flanges 23/31 to either of the structural members 60/62. The predisposed fastener members 35 can be manipulated to engage and attach the flange 23/31 to the structural members 60 and 62. In some embodiments, the fastener members 35, for example screws, can be initially started by the application of force, for example, from a tool such as a hammer, and thereafter screwed into the structural members 60 and 62. However, in some embodiments, this is not necessary, and the fastener members 35, can be simply screwed into the structural members 60 and 62, for example using a tool (manual and/or powered) such as a screwdriver, a wrench, a drill having an appropriate screwdriver or wrench bit, or the like. Once attached to the structural members 60 and 62 the assembly 10 can be in supporting and/or securing engagement with the building component 64. In the embodiment shown, the building component 64 engages the surface of the assembly 10 adjacent the base wall 34. A fastener member, for example a threaded fastener member 39 may then be inserted into the pilot hole 47 and manipulated such that it attaches the assembly 10 to the building component 64. As can be appreciated by those of skill in the art and others, the captivated and/or predisposed fastener members 35 can provide significant advantage during installation, as discussed above.

Also to be appreciated by those of skill in the art and others, the certain advantages can be provided by the adjustable length configuration of the assembly 10. For example, often the spacing between structural members, such as floor joists, can vary from one building to the next, or even within a single building. As such, the use of an adjustable length assembly 10 can be used to adapt to these differences. Additionally, the adjustable length of the assembly 10 may be valuable during installation, for example, if the assembly 10 needs to be installed in a location where there is little room for installation. For example, the assembly 10 can be shortened for insertion into a tight installation space, and then expanded to the appropriate length for installation.

Figure 4:
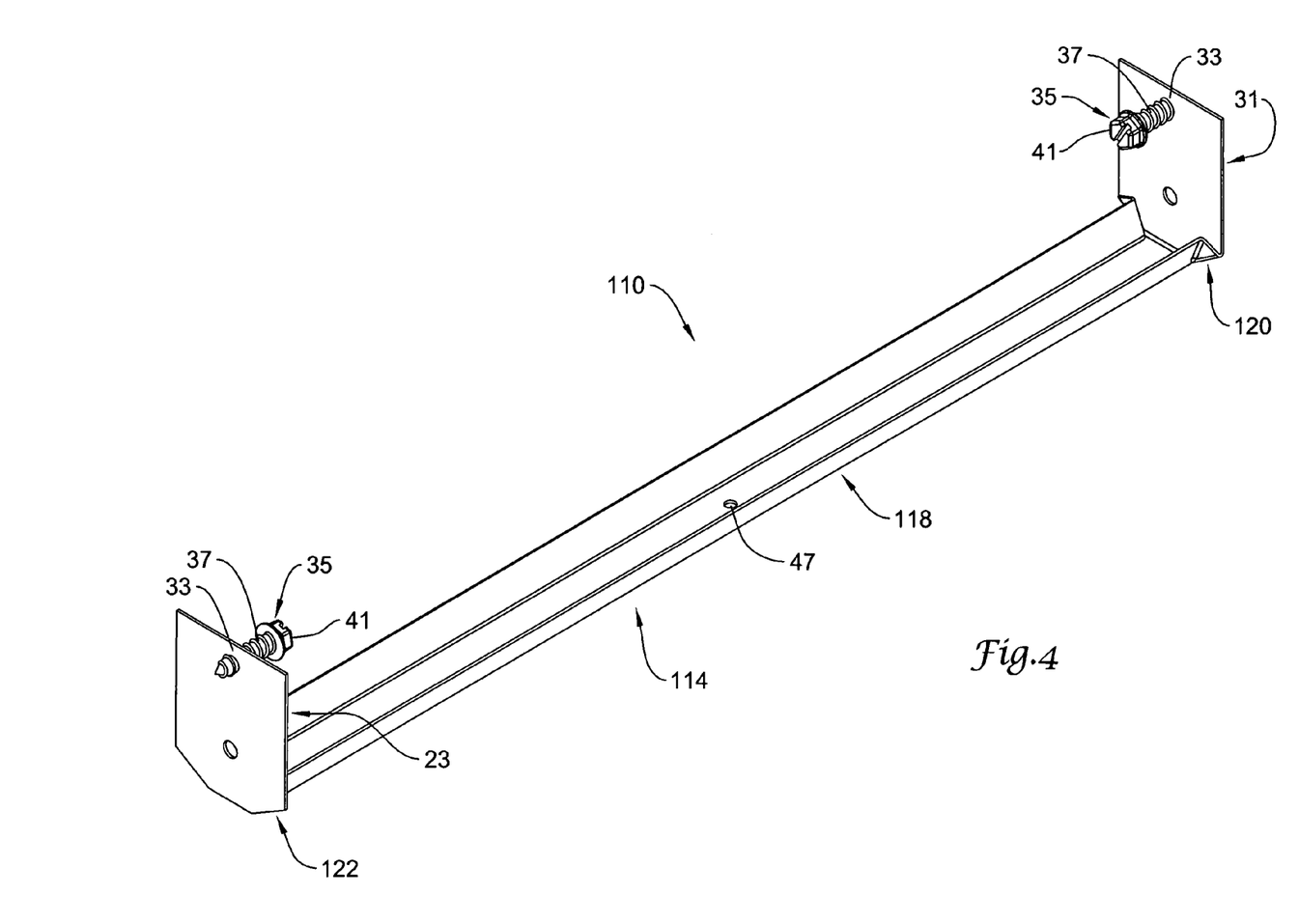
FIG. 4 is a schematic perspective view of an example embodiment of a non-expandable hanger assembly in accordance with another example embodiment.

Refer now to FIG. 4, which shows another example embodiment of a bracket assembly 110, similar to the assembly 10 discussed above, wherein like reference numbers indicate similar structure. In this embodiment, the bracket assembly 110 is non-extendable, and the elongated structure includes only a single elongated member 114 having one elongated body portion 118. The body portion 118 includes a first end 120 and a second end 122, each including a flange 23/31. Similar to the embodiment discussed above, the flanges 23/31 each include openings 33 into which a threaded fastening member 35 has been predisposed. The structure, size, materials, and methods of construction and/or use of the assembly 110, elongated member 114, body portion 118, flanges 23/31, openings 33, and the mechanism for predisposing the fastening members 35 can be in general accordance with those discussed herein. One significant difference between the assembly 110 and the assembly 10 is that the assembly 110 does not include a mechanism for adjusting the length of the assembly 110. Therefore, in at least some embodiments, the assembly 110 can be provided with a length that would match or exceed spacing between structural members in a building, for example floor joists. In cases where the length of the assembly 110 may exceed the distance between structural members, the assembly 110 may be mounted at an angle between the structures.

Figures 5, 6:
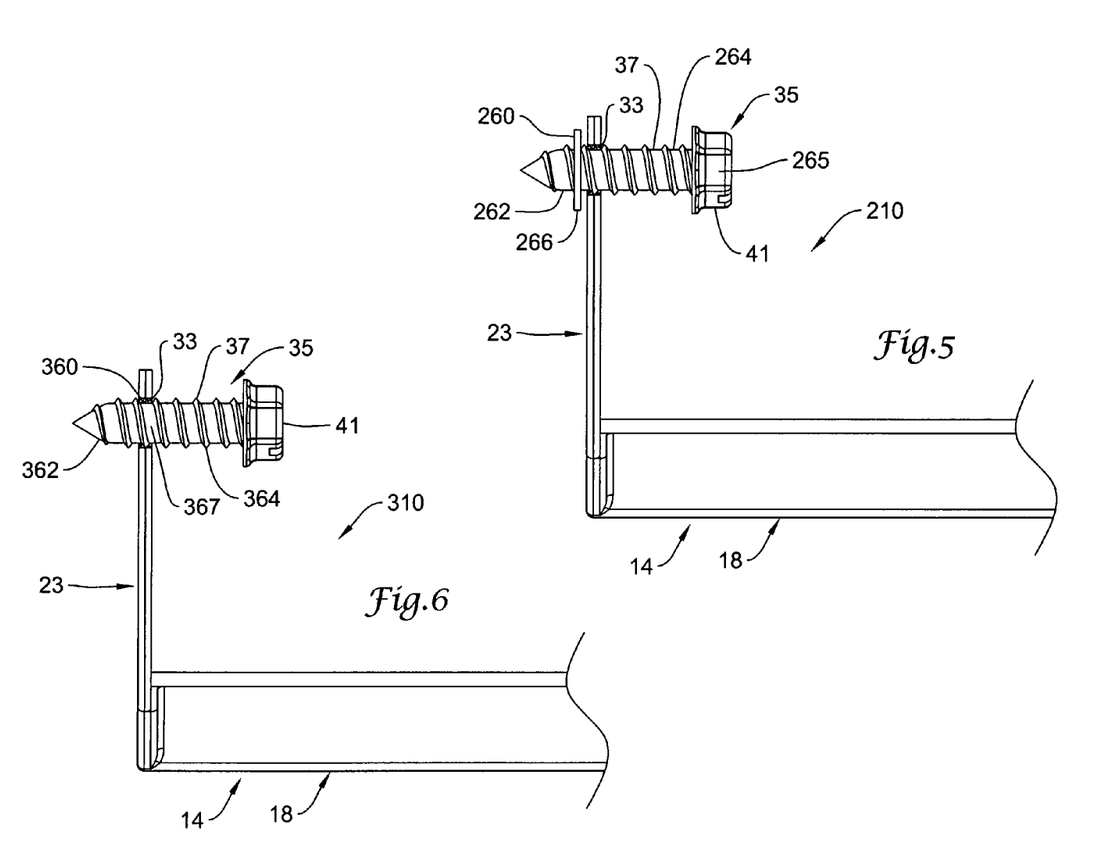
FIG. 5 is a schematic partial side view of a hanger assembly including an alternative configuration for providing a pre-disposed fastening member.
FIG. 6 is a schematic partial side view of a hanger assembly including another alternative configuration for providing a pre-disposed fastening member.

Refer now to FIG. 5, which shows another example embodiment of a portion of a bracket assembly 210. The bracket assembly 210 can be similar to either of the bracket assemblies 10 and 110 discussed above (i.e. may be expandable and/or non-expandable), wherein like reference numbers indicate similar structure. In this embodiment, however, the assembly 210 includes alternative structure for captivating the fastener member 35 within the opening 33 defined in the flange 23. The fastener member 35 is disposed within the opening such that it includes a first portion 262 extending out of one side of the opening 33, and a second portion 264 extending out of the opposite side of the opening 33. A stop member 260 is disposed about and engaged with the first portion 262 of the fastener member 35. The stop member 260 includes structure adapted and/or configured to prevent removal of the fastener member 35 from the opening 33. For example, the stop member 260 may include an outer periphery 266 that is bigger than the outer periphery of the opening 33. Additionally, the second portion 264 of the fastener member 35 includes a head portion 265 that has an outer periphery greater than the outer periphery of the opening 33. Therefore, the fastening member 35 can be pre-disposed within the opening 33 between the stop member 260 and the head portion 265.

The stop member 260 can be selectively removable, or can be permanently disposed about the fastener member 35. For example, in some embodiments, the stop member 260 can be threadingly engaged with the fastener member 35 so that it may be selectively removed. In other embodiments, the stop member 260 can be otherwise attached and/or disposed about the fastener member 35 using any of a broad variety of suitable technique, for example, mechanical bonding, adhesive bonding, soldering, brazing, welding, or the like.

Refer now to FIG. 6, which shows another example embodiment of a portion of a bracket assembly 310. The bracket assembly 310 can be similar to either of the bracket assemblies 10 and 110 discussed above (i.e. may be expandable and/or non-expandable), wherein like reference numbers indicate similar structure. In this embodiment, however, the assembly 310 includes another alternative structure for captivating the fastener member 35 within the opening 33 defined in the flange 23. The fastener member 35 is disposed within the opening 33 such that it includes a first portion 362 extending out of one side of the opening 33, a second portion 364 extending out of the opposite side of the opening 33, and a portion 367 disposed within the opening 33. A securing material 360 is disposed about and engaged with the portion 367 of the fastener 35 disposed within the opening 33. The securing material 360 is also disposed within the opening 33 and engaged with the flange 33 about the perimeter of the opening 33. The securing material 360 can act to selectively couple the fastener member 35 within the opening 33, and thereby predispose the fastener member 35 within the opening 33. Some examples of suitable securing material 360 may include adhesive, a gasket or like member, for example a polymer or metal gasket, solder, braze, weld, or the like.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification. It should be understood that this disclosure is, in many respects, only illustrative. Changes may be made in details, particularly in matters of shape, size, and arrangement of steps without exceeding the scope of the invention. The scope of the invention is, of course, defined in the language in which the appended claims are expressed.

What is claimed is:

1. A hanger assembly for securing a building component to one or more structural members of a building, the assembly comprising:
   an elongated structure including a first end and a second end;
   a flange disposed on die first end and defining an opening therein having an outer perimeter defined by the flange, the flange configured for being coupled to a structural member of a building;
   a screw pre-disposed and captivated within the opening, wherein captivation is achieved by the screw being configured such that threading on the screw threadingly engages the outer perimeter of the opening, the screw configured to couple the flange to the structural member of a building.

2. The hanger assembly of claim 1, further including:
   a second flange disposed on the second end and defining a second opening therein having an outer perimeter defined by the second flange, the second flange configured for being coupled to a second structural member of a building; and
   a second screw pre-disposed and captivated within the second opening, wherein captivation is achieved by the second screw being configured such that threading on the second screw threadingly engages the outer perimeter of the second opening, the second screw configured to couple the second flange to the second structural member of a building.

3. The hanger assembly of claim 1, wherein the flange defines a first side and a second side, and the screw pre-disposed in the opening includes a first portion disposed on the first side of the flange, and a second portion disposed on the second side of the flange, the first portion including a head member having an outer perimeter that is greater than the outer perimeter of the opening, and the assembly further including a stop member coupled to the second portion of the screw, the stop member having an outer periphery sized to prevent removal of the screw from the opening.

4. The hanger assembly of claim 1, wherein the screw pre-disposed in the opening includes a portion disposed within the opening, and the assembly further including a securing material disposed between and coupled to the portion of the screw and the outer perimeter of the opening.

5. The hanger assembly of claim 1, wherein the assembly further includes a structure adapted to engage the building component.

6. The hanger assembly of claim 5, wherein the structure adapted to engage the building component includes a pilot hole defined in the elongated structure, and a threaded fastening member configured to extend through the pilot hole and into coupling communication with the building component.

7. The hanger assembly of claim 1, wherein the building component is an HVAC duct, and the structural members of a building comprise one or more floor joists.

8. The hanger assembly of claim 1, wherein the elongated structure has a length, and further includes a structure for adjustment of the length of the elongated structure.

9. The hanger assembly of claim 8, wherein the elongated structure extends along a longitudinal axis, and the elongated structure includes a first elongated member and a second elongated member, the first and second elongated members configured for selective sliding engagement along the longitudinal axis such that the effective length of the assembly can be selectively adjusted.

10. An expandable duct hanger assembly for securing ducts between structural members of a building, the assembly comprising:
- a first elongated member including a first elongated body portion having a first end and a second end, and a first flange disposed on the second end of the first elongated body portion, the first flange configured for being coupled to a first structural member of a building and defining a first opening therein having an outer perimeter defined by the first flange;
- a second elongated member including a second elongated body portion having a first end and a second end, and a second flange disposed on the second end of the second elongated body portion, the second flange configured for being coupled to a second structural member of a building and defining a second opening therein having an outer perimeter defined by the second flange;
- wherein first and second body portions are in selective sliding engagement with one another along a longitudinal axis such that the effective length of the assembly can be selectively adjusted;
- a first screw pre-disposed and captivated within the first opening, wherein captivation is achived by the first screw configured to couple the first flange to the first structural member of a building; and
- a second screw pre-disposed and captivated within the second opening, wherein captivation is achived by the second screw configured to couple the second flange to the second structural member of a building.

11. A method for securing a building component to one or more structural members of a building, the method comprising:
(a) providing a hanger assembly including:
- an elongated structure including a first end and a second end;
- a flange disposed on the first end and defining an opening therein having an outer perimeter defined by the flange, the flange configured for being coupled to a structural member of a building; and
- a screw pre-disposed within the opening, the screw configured to couple the flange to the structural member of a building;

(b) positioning the hanger assembly such that a portion of it engages the building component, and such that the flange is disposed adjacent the structural member of the building; and
(c) manipulating the predisposed screw such that it couples the flange to the structural member.

12. The method of claim 11, wherein the screw of the hanger assembly includes a portion disposed within the opening, and the assembly further including a securing material disposed between and coupled to the portion of the screw and the outer perimeter of the opening.

13. The method of claim 11, wherein the hanger assembly further includes a pilot hole defined in the elongated structure, and a threaded fastening member configured to extend through the pilot hole and into coupling communication with the building component.

14. The method of claim 11, wherein the elongated structure of the hanger assembly has a length, and further includes structure for adjustment of the length of the elongated structure.

15. The method of claim 11, wherein the flange of the hanger assembly defines a first side and a second side, and the screw pre-disposed in the opening includes a first portion disposed on the first side of the flange, and a second portion disposed on the second side of the flange, the first portion including a head member having an outer perimeter that is bigger than the outer perimeter of the opening, and the assembly further including a stop member coupled to the second portion of the screw, the stop member having an outer perimeter sized to prevent removal of the screw from the opening.

16. A method for securing a building component between one or more structural members of a building, the method comprising:
a) providing a hanger assembly including:
- an elongated structure including a first end and a second end;
- a first flange disposed on the first end and defining a first opening therein having an outer perimeter defined by the first flange, the first flange configured for being coupled to a first structural member of a building;
- a second flange disposed on the second end and defining a second opening therein having an outer perimeter defined by the second flange, the second flange configured for being coupled to a second structural member of a building;
- a first screw pre-disposed within the first opening, the first screw configured to couple the first flange to the first structural member of a building; and
- a second screw pre-disposed within the second opening, the second screw configured to couple the second flange to the second structural member of a building;

(b) positioning the hanger assembly such that a portion of it engages the building component, and such that the hanger assembly is between the first structural member and the second structural member;
(c) manipulating the first screw such that it couples the first flange to the first structural member; and
(d) manipulating the second screw such that it couples the second flange to the second structural member.

* * * * *

UNITED STATES PATENT AND TRADEMARK OFFICE
CERTIFICATE OF CORRECTION

PATENT NO. : 7,040,586 B2
APPLICATION NO. : 10/7285893
DATED : May 9, 2006
INVENTOR(S) : Angelo Joseph Kusber et al.

It is certified that error appears in the above-identified patent and that said Letters Patent is hereby corrected as shown below:

Column 12
Line 7, delete "die", and insert therfor --the--.

Column 13
Line 23, delete "is achieved by the" ,and insert therefor -- is achieved by the first screw being configured such that threading on the first screw threadingly engages the outer perimeter of the first opening, the --.

Line 27, delete "is achieved by the" ,and insert therefor -- is achieved by the second screw being configured such that threading on the second screw threadingly engages the outer perimeter of the second opening, the --.

Line 40, delete "pre-disposed within the opening", and insert therefor -- pre-disposed and captivated within the opening, wherein captivation is achieved by the screw being configured such that threading on the screw threadingly engages the outer perimeter of the opening --.

Line 47, after "predisposed", and insert therefor -- and captivated --.

Column 14
Line 37, delete "pre-disposed within the first opening", and insert therefor -- pre-disposed and captivated within the first opening, wherein captivation is achieved by the first screw being configured such that threading on the first screw threadingly engages the outer perimeter of the first opening --.

UNITED STATES PATENT AND TRADEMARK OFFICE
CERTIFICATE OF CORRECTION

PATENT NO. : 7,040,586 B2
APPLICATION NO. : 10/728593
DATED : May 9, 2006
INVENTOR(S) : Angelo Joseph Kusber et al.

It is certified that error appears in the above-identified patent and that said Letters Patent is hereby corrected as shown below:

Line 40, delete "pre-disposed within the second opening", and insert therefor -- pre-disposed and captivated within the second opening, wherein captivation is achieved by the second screw being configured such that threading on the second screw threadingly engages the outer perimeter of the second opening --.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,040,586 B2 |
| APPLICATION NO. | : 10/728593 |
| DATED | : May 9, 2006 |
| INVENTOR(S) | : Angelo Joseph Kusber et al. |

It is certified that error appears in the above-identified patent and that said Letters Patent is hereby corrected as shown below:

Column 12
Line 7, delete "die", and insert therfor --the--.

Column 13
Line 23, delete "is achieved by the" ,and insert therefor -- is achieved by the first screw being configured such that threading on the first screw threadingly engages the outer perimeter of the first opening, the --.

Line 27, delete "is achieved by the" ,and insert therefor -- is achieved by the second screw being configured such that threading on the second screw threadingly engages the outer perimeter of the second opening, the --.

Line 40, delete "pre-disposed within the opening", and insert therefor -- pre-disposed and captivated within the opening, wherein captivation is achieved by the screw being configured such that threading on the screw threadingly engages the outer perimeter of the opening --.

Line 47, after "predisposed", and insert therefor -- and captivated --.

Column 14
Line 37, delete "pre-disposed within the first opening", and insert therefor -- pre-disposed and captivated within the first opening, wherein captivation is achieved by the first screw being configured such that threading on the first screw threadingly engages the outer perimeter of the first opening --.

UNITED STATES PATENT AND TRADEMARK OFFICE
CERTIFICATE OF CORRECTION

PATENT NO. : 7,040,586 B2
APPLICATION NO. : 10/728593
DATED : May 9, 2006
INVENTOR(S) : Angelo Joseph Kusber et al.

It is certified that error appears in the above-identified patent and that said Letters Patent is hereby corrected as shown below:

Line 40, delete "pre-disposed within the second opening", and insert therefor -- pre-disposed and captivated within the second opening, wherein captivation is achieved by the second screw being configured such that threading on the second screw threadingly engages the outer perimeter of the second opening --.

This certificate supersedes Certificate of Correction issued September 5, 2006.

Signed and Sealed this

Seventh Day of November, 2006

JON W. DUDAS
*Director of the United States Patent and Trademark Office*